United States Patent [19]
Talan

[11] 3,959,853
[45] June 1, 1976

[54] FASTENING PEG AND METHOD OF MAKING SAME

[76] Inventor: Maryan Talan, 68 rue Bonaparte, 75006 Paris, France

[22] Filed: Feb. 3, 1975

[21] Appl. No.: 546,824

[30] Foreign Application Priority Data
Feb. 14, 1974  France............................ 74.04973

[52] U.S. Cl. .................................. 24/73 PF; 85/80
[51] Int. Cl.² .................... A44B 21/00; F16B 13/04
[58] Field of Search ............ 85/80; 24/73 HS, 73 P, 24/73 PF, 73 PM

[56] References Cited
UNITED STATES PATENTS

| | | | |
|---|---|---|---|
| 3,074,134 | 1/1963 | Buechler | 24/73 HS |
| 3,130,822 | 4/1964 | Meyer | 24/73 PM UX |
| 3,213,746 | 10/1965 | Dwyer | 85/80 |
| 3,651,734 | 3/1972 | McSherry | 85/80 |

FOREIGN PATENTS OR APPLICATIONS
1,109,793  4/1968  United Kingdom.................... 85/80

*Primary Examiner*—Donald A. Griffin
*Attorney, Agent, or Firm*—Michael J. Striker

[57] ABSTRACT

This fastening device comprises a central internal plug formed with retaining notches and engageable in an external peg consisting of separate legs formed with internal and external notches and connected to the inner end of said plug by means of flexible strips molded integrally with said legs and said plug. The legs are folded against the plug and the latter comprises a flange for limiting its inward movement and means for supporting the object to be fastened. The assembly is molded as a one-piece member in a three-section mold with one joint plane formed with the impression for molding said legs in a plane perpendicular to the axis of said plug, said plug being molded in the other mold sections.

6 Claims, 7 Drawing Figures

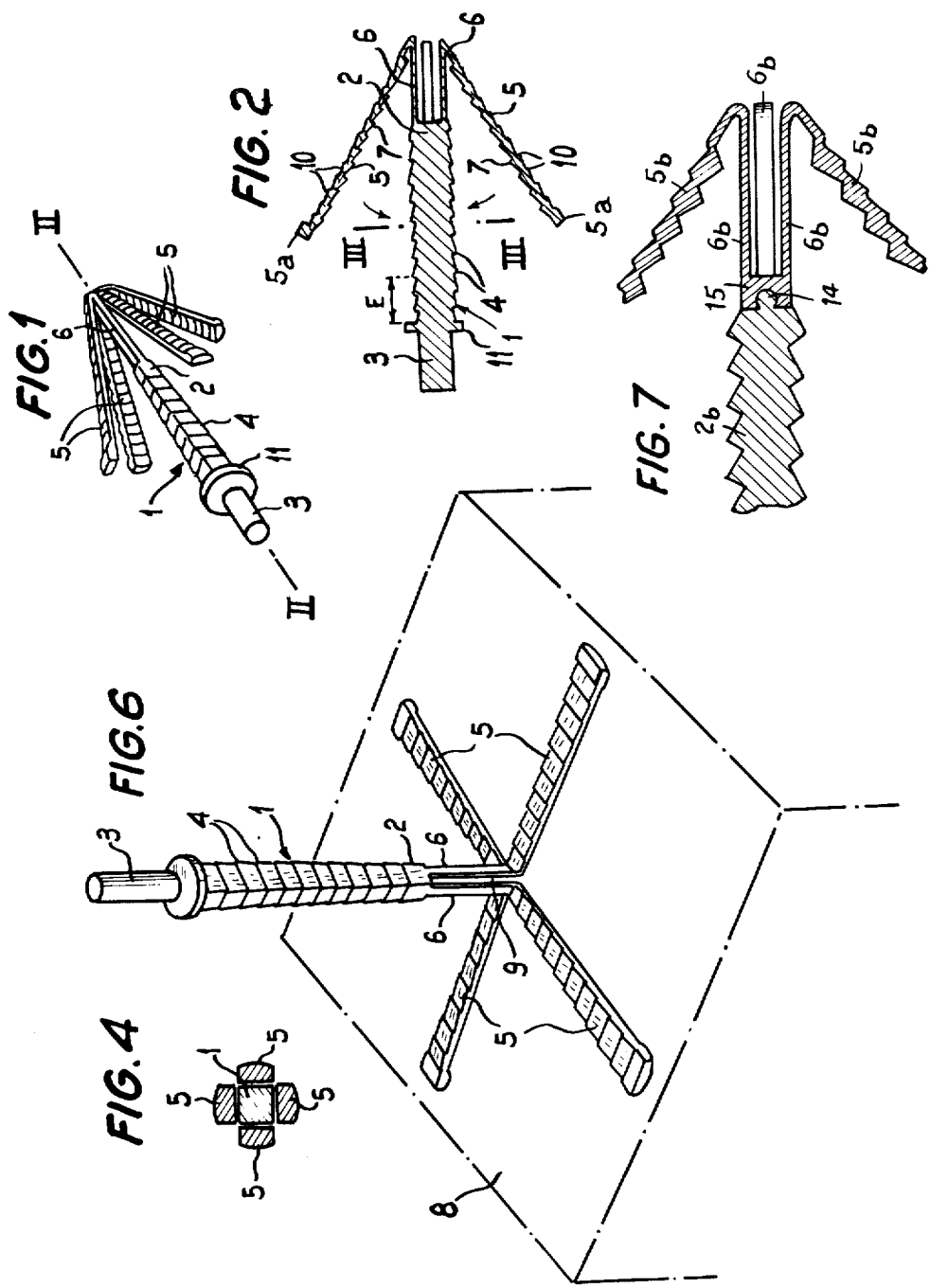

FASTENING PEG AND METHOD OF MAKING SAME

BACKGROUND OF THE INVENTION

The present invention relates to devices intended for fastening any article or object to a support, such as a wall, of a nature not permitting the direct screwing of a screw or similar means. This occurs notably when it is desired to secure an object to a wall supporting a layer of plaster of Paris or other similar friable material.

DESCRIPTION OF THE PRIOR ART

More particularly, this invention is concerned with fastening means of the type comprising in combination an expansible split peg adapted to be driven into a hole formed beforehand in the support or the corresponding wall, and an expansion plug adapted to be engaged into said peg in order to constitute the fastening member proper for the object to be secured. This plug is retained within the corresponding peg by retaining or anchoring notches formed on the outer peripheral surface of the plug and adapted to co-act with corresponding teeth or grooves formed in the inner wall of the peg.

However, the cost of hitherto known devices of this character is higher than that of simple, conventional pegs, since they comprise two separate component elements generally manufactured by moulding from plastic material. On the other hand, the manufacture of one of these elements, namely the external peg, is attended by serious drawbacks, notably for obtaining the inner notches thereof. In fact, the presence of these notches makes the stripping of this peg particularly difficult and involves the use of a complicated and therefore expensive mould.

SUMMARY OF THE INVENTION

It is therefore the essential object of the present invention to provide a fastening device of the same kind but of original design whereby the component elements thereof can be manufactured very easily in the form of a one-piece or integral element.

To this end, this device is characterised essentially in that the peg proper comprises a series of legs disposed around the inner plug and secured to the front end of this plug by means of flexible connecting strips, said legs and strips constituting an integral moulded piece of plastic material incorporating at least one portion of the inner plug.

The notches or ribs formed internally of the peg in the operating conditions thereof may thus be obtained very easily on the corresponding faces of the various legs. On the other hand, the device according to this invention is advantageous in that its various component elements remain attached to one another. However, after the device has been stripped from the manufacturing mould, the external legs are folded through 180° against the body of the inner plug, this movement being permitted by the flexibility of the aforesaid strips connecting the internal plug body to the external ribbed legs.

The present device is adapted to be used in the same fashion as the conventional devices of this character which consist of two elements, i.e. by driving the complete device into the supporting wall or other surface or material, and then causing the inner plug to penetrate into the thus folded legs of the peg, whereby these legs are expanded and wedged in the corresponding hole. In this respect, it may be noted that the driving of the internal plug between the external legs is permitted by the flexibility of the connecting strips.

However, other features and advantages of the device of the present invention will appear as the following description proceeds with reference to the attached drawing illustrating diagrammatically by way of example a typical form of embodiment of the device. In the drawing:

BRIEF DESCRIPTION OF THE DRAWING

FIG. 1 is a perspective view of the fastening device according to this invention, shown before the external legs are folded against the inner plug;

FIG. 2 is an axial section taken along the line II—II of FIG. 1;

FIG. 4 is a cross section taken along the line IV—IV of FIG. 3;

FIG. 6 is a diagrammatic perspective view illustrating the method of manufacturing the fastening device of this invention in the form of a one-piece plastic moulding, and FIG. 7 is a fragmentary axial section showing a modified form of embodiment of the device.

DESCRIPTION OF THE PREFERRED EMBODIMENT

Figure 3:
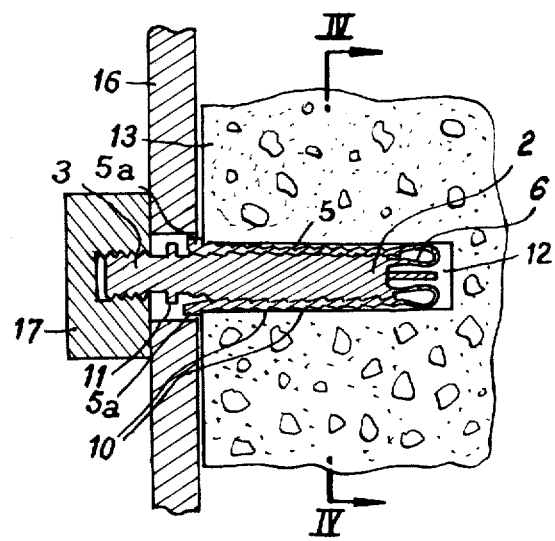
FIG. 3 is an axial section of the device shown after the driving thereof into a cavity formed in a wall.
Figure 5:
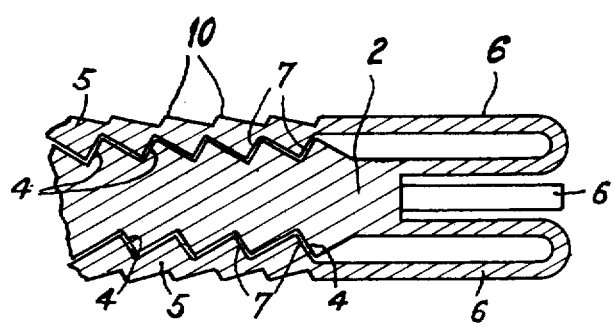
FIG. 5 is a fragmentary axial section showing on a different scale the front end of the device of FIG. 3 after driving said device into a cavity formed in a wall, in the fastening position thereof.

The fastening device according to the present invention comprises an internal expansion plug designated in general by the reference numeral 1. This plug of square cross-sectional configuration increasing from the front end 2 to the rear end 3, as shown. Besides, the lateral faces of this plug have spaced notches or ribs 4 formed thereon, which act as ratchet or catch teeth, with the shoulders or surfaces thereof perpendicular to the axis facing the rear end 3.

The device of this invention also comprises a series of legs 5 equal in number to the faces of the internal plug 1 and adapted to be folded separately against one of these faces. When these legs 5 are thus folded against the corresponding faces of the plug, they surround same completely as illustrated in FIG. 3. Thus, said legs 5 constitute a kind of expansible peg departing from the external pegs usually provided in devices of this character by the fact that it consists of separate elements instead of a continuous sleeve in which one or several expansion slits are formed. In the present instance, the expansion slits of the peg consist of the narrow gaps left between the various legs 5.

Each leg 5 is connected to the front end of the corresponding face of the internal plug 1 by means of a strip 6 thin enough to have the necessary flexibility. On the other hand, these legs 5 have notches or teeth 7 similar to the notches or teeth 4 formed in the various faces of plug 1, but said notches or teeth 7 are opposed to those 4 of said plug. In fact, the shoulders of these notches 7 are directed towards the front end, instead of the rear end of the device. Under these conditions, when the plug 1 is subsequently driven into the central space left between the legs 5, the notches 4 of plug 1 can cooperate with those 7 of said legs.

Due to the original structure of the fastening peg comprising a peg-forming external portion made of a plurality of separate legs 5, it is an easy matter to form the notches 7 contemplated in the external surface of these legs. In fact, this shape does not give rise to any moulding difficulty, in contrast to the manufacture of a one-piece tubular peg comprising internal notches.

Besides, as already mentioned in the foregoing, the present invention is also concerned with an advantageous method of manufacturing this fastening device.

According to this method, the two component elements of the device, namely the internal plug 1 and the external legs 5, constitute a single piece moulded integrally with the flexible connecting strips 6 in a three-section mould. According to this method, the four external legs 5 (this number being given by way of example, of course, since a lower or higher number may be adopted, if desired, without departing from the scope of the invention) are moulded along one of the joint planes of the mould in such position that they extend radially from a central point and at right angles to the axis of plug 1. Besides, this specific moulding position is clearly apparent in FIG. 6. In this Figure, one of the mould sections 8 has formed in one face the impressions necessary for moulding the four legs 5 in a plane perpendicular to the axis of plug 1. This mould face further carries a perpendicular stud 9 adapted to reserve the empty space contemplated between the flexible connecting strips.

On the other hand, the plug 1 is moulded in a cavity consisting of two halves each formed in one of the other two mould sections, these sections (not shown) being adapted to be assembled with each other and superposed to the first section 8 in order to close the joint plane corresponding to the moulding of legs 5. Thus, all the component elements of the device can be moulded as a one-piece structure during a single injection operation. As will readily occur to those conversant with the art, this affords very considerable savings and furthermore the manufacture is greatly simplified.

After stripping the device from the mould, the various legs 5 may be folded around the plug 1 as explained heretofore due to the specific flexibility of the connecting strips 6. In their folded condition the legs 5 constitute a kind of expansible peg around the internal plug 1. In this respect it may be emphasized that the legs 5 have a convex contour on their external faces, so that when they are gathered about the internal plug, the cross-sectional contour of the assembly is substantially circular, as in a conventional fastening peg.

Under these conditions, the fastening device of the present invention can be utilized in the same fashion as hitherto known expansion fastening devices. In fact, the complete device as shown in FIG. 1 is driven into a hole 12 formed in the wall or corresponding support 13 (FIG. 3) and then the plug 1 is forced into the narrow passage left between the various external legs 5 to expand and eventually wedge them firmly in said hole.

During the plug driving movement the notches 4 thereof gradually engage the notches 7 formed in the internal faces of the external legs 5. Under these conditions, the internal plug 1 is safely secured in position and cannot be subsequently loosened in an undesired or untimely manner, for example when subjected to vibration or shocks. Preferably, the legs 5 comprise on their inner faces ribs or like suitable relief patterns 10 adapted to improve their adherence to the walls of the corresponding fastening hole.

When the internal plug 2 is driven into the passage left between the legs 5, a relative backward movement of these legs 5 takes place, together with a certain distortion of the flexible connecting strips 6 at the front end of the device. In fact, before utilizing the device the strips 6 are folded in such a manner that the rear ends 5a of legs 5 lie at a distance E from a flange 11 provided at the rear end of plug 2 for limiting the permissible driving thereof into the peg. However, the subsequent driving of this plug, when actually using the device of the present invention, is attended by a forward movement of said plug between the legs 5. Now this movement is permitted on the one hand by the inherent flexibility of the strips 6 which can thus undergo a suitable distortion, and on the other hand by the distance E existing initially between the rear end 5a of legs 5 and said flange 11. In fact, this flange 11 can thus move further towards the ends 5a of said legs during the driving of the internal plug.

The flange 11 is adapted to limit the inward movement of plug 1 so that the rear portion 3 of this plug 1 will remain outside the plug to constitute a useful member for securing the object to be held in position. To this end, said rear portion 3 may have various configurations. Thus, it may comprise a screw-threaded portion for receiving a nut 17 adapted to hold in position the object to be fastened, for instance a panel 16. But said end portion 3 of plug 2 may also comprise relief patterns for securing this object by snap action, or any other suitable fastening means.

Of course, it will readily occur to those skilled in the art that this device could embodied in many different ways, inasmuch as the invention is by no means limited by the specific form of embodiment illustrated and described by way of example. Thus, complementary means could be provided for holding the external legs 5 against the plug body 1 before utilizing the device, said legs being then disposed in such position that their rear ends be located at a predetermined distance E of the rear flange 11 of plug 1.

Besides, instead of consisting of a single integral moulded piece of plastic material, the present device may be manufactured by moulding the external legs and the flexible fastening or connecting strips on a rigid member of metal or other suitable material, constituting the very body of the plug. This modified structure is illustrated in FIG. 7.

In this alternate form of embodiment, the plug body 2b consists of a rigid metal member carrying at its inner end a part-spherical knob or like projection 14 adapted to fit snuggly in a plastic boss 15 assembled by moulding to said plug. In fact, the boss 15 acts as a junction member between the plug body 2b and the flexible connecting strips 6b to which the legs 5b constituting the external peg are attached. In fact, these legs and strips are plastic elements moulded integrally with the plastic boss 15 at the corresponding end of the body 2b of said internal plug.

The specific advantage deriving from this modified structure is that the plug body can be made from a material considerably harder and stronger than the material constituting the external legs 5b and connecting strips 6b. Besides, with this structure it is possible to manufacture the legs and strips from a particularly flexible and compressible material. Otherwise, this modified structure has the same advantageous features as the preceding form of embodiment.

Of course, the body proper of the internal plug and the strips for connecting the external legs may be assembled in a different manner. If desired, the rigid body of said plug may constitute a simple core of this plug, this core being covered partially or completely with an additional layer of plastic material formed integrally by moulding with the connecting strips 6b and the external legs 5b. But also in this case many other modifications and variations may be contemplated without departing from the basic principles of this invention.

Due to the specific advantageous features characterising this invention, the device thereof may be used for fastening any desired objects to a wall or other support in which it would not be possible to use directly a screw or any other fastening member of this kind.

What is claimed as new is:

1. A device for fastening an object to a support comprising an expansible peg adapted to be driven into a hole of the support; an expansion plug located centrally in said expansible peg and having a front end and a rear end, said expansion plug having a polygonal cross section and said expansible peg comprising a plurality of legs disposed about said expansion plug, the number of said legs corresponding to that of the faces of said plug; flexible connecting strips connecting the front end of each leg to the front end of said plug, said connecting strips are folded on themselves in such a manner that the rear ends of said legs are spaced from the rear end of said plug; and a flange provided on said plug adjacent the rear end thereof for limiting driving of said plug into the peg-forming portion of the device, said legs, said strips and at least a portion of said plug being integrally molded from plastic material and the lengths of said strips being such that they permit by the distortion thereof forward movement of said plug relative to said legs during driving of the device into the hole, the external faces of said legs having a substantially convex shape so that the device has a circular cross section when said legs are folded against said plug.

2. A fastening device as set forth in claim 1, wherein at least some of said legs comprise on their inner faces notches adapted to cooperate with companion notches formed on the registering faces of said internal plug.

3. A fastening device as set forth in claim 2, wherein the body of said internal plug is molded integrally from a suitable plastic material with said flexible connecting strips and said legs constituting the external peg.

4. A fastening device as set forth in claim 2, wherein the body of said internal plug consists of a rigid member and has molded thereon the end of said plug together with the flexible connecting strips and the legs constituting the external peg.

5. A fastening device as set forth in claim 2, wherein said rigid member is of metal.

6. A fastening device as set forth in claim 1, wherein said plug has a square cross section.

* * * * *